(12) United States Patent
Wurmfeld et al.

(10) Patent No.: US 10,908,475 B2
(45) Date of Patent: Feb. 2, 2021

(54) DIGITALLY CONTROLLED DYNAMIC LENS

(71) Applicant: CAPITAL ONE SERVICES, LLC, McLean, VA (US)

(72) Inventors: David Wurmfeld, Falls Church, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/202,036

(22) Filed: Nov. 27, 2018

(65) Prior Publication Data

US 2020/0166820 A1 May 28, 2020

(51) Int. Cl.
*G02F 1/29* (2006.01)
*G03H 1/22* (2006.01)
*G02F 1/1337* (2006.01)

(52) U.S. Cl.
CPC ............. *G02F 1/29* (2013.01); *G03H 1/2205* (2013.01); *G03H 1/2249* (2013.01); *G02F 2001/133769* (2013.01); *G02F 2001/294* (2013.01); *G02F 2201/12* (2013.01); *G03H 2001/221* (2013.01); *G03H 2001/2273* (2013.01)

(58) Field of Classification Search
CPC ........... G02F 1/29; G02F 2001/133769; G02F 2001/294; G02F 2201/12
See application file for complete search history.

(56) References Cited

U.S. PATENT DOCUMENTS

| 5,424,927 A * | 6/1995 | Schaller | F21L 4/005 362/157 |
| 5,742,331 A * | 4/1998 | Uomori | H04N 13/302 348/51 |
| 6,927,823 B1 * | 8/2005 | Reznikov | G02F 1/133788 349/124 |
| 2004/0108984 A1 * | 6/2004 | Ogasawara | G02F 1/13471 345/87 |
| 2018/0144710 A1 * | 5/2018 | Walker | G02F 1/133753 |

* cited by examiner

*Primary Examiner* — Lucy P Chien
(74) *Attorney, Agent, or Firm* — Pillsbury Winthrop Shaw Pittman LLP (57) ABSTRACT

A digitally controlled lens system is disclosed. In some embodiments, the lens system includes a controller and an electro-optic lens electrically connected to the controller. The electro-optic lens includes a first substantially transparent substrate; a first electrode layer disposed on the first substantially transparent substrate, the first electrode layer including a plurality of electrodes; a second substantially transparent substrate; a second electrode layer disposed on the second substantially transparent substrate; and a liquid crystal layer located between the first electrode layer and the second electrode layer. The controller is configured to generate a refractive index pattern of liquid crystal layer by controlling voltage applied on the first electrode layer and the second electrode layer.

10 Claims, 6 Drawing Sheets

DIGITALLY CONTROLLED DYNAMIC LENS

TECHNICAL FIELD

The present disclosure generally relates to digitally controlled dynamic lenses, and more particularly, to a liquid crystal lens with a focusing capability that can be dynamically changed by controlling an electric field applied to the lens.

BACKGROUND

Lenses are used for bending the direction of a light beam. Conventional lenses have fixed shapes. They are made by radially shaping materials like glass and plastics that exhibit a constant refractive index. Diffraction-limited performance can be achieved using precise shaping and polishing, but is often not achievable within the economic design constraints placed on the optical systems of many consumer products. Typically, such systems have undesirable optical distortions or aberrations that are corrected using more than one lens group, commonly having spherical elements. The system can be simplified by replacing several spherical lenses with a high-quality aspheric lens with a parabolic profile, but that generally adds cost to the system. In addition, a conventional lens has one fixed focal length. To vary the focal length of an imaging system, an array of lenses is typically used and the focal length is changed by mechanically moving components that adjust the distance between lenses. This approach inevitably makes the system bulky and inefficient, and unsuited to some applications.

For example, zoom lens assembly employed in conventional cameras employs multiple lenses which must be mechanically moved relative to one another to obtain variation and magnification and for focusing. Typically a small electric motor is used to drive the lenses. It would be desirable to incorporate zoom lenses on small portable cameras, such as the type used with cellular phones, but the physical limitations of the small devices make the provision of a conventional zoom lens impossible.

The disclosed apparatus and methods address one or more of the problems listed above.

BRIEF SUMMARY

The disclosed embodiments are directed to a digitally controlled liquid crystal lens.

In some embodiments, a digitally controlled lens system is disclosed. The lens system includes a controller and an electro-optic lens electrically connected to the controller. The electro-optic lens includes a first substantially transparent substrate; a first electrode layer disposed on the first substantially transparent substrate, the first electrode layer comprising a plurality of electrodes; a second substantially transparent substrate; a second electrode layer disposed on the second substantially transparent substrate; and a liquid crystal layer located between the first electrode layer and the second electrode layer. The controller is configured to generate a refractive index pattern of liquid crystal layer by controlling voltage applied on the first electrode layer and the second electrode layer.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings.

DETAILED DESCRIPTION

Reference will now be made to exemplary embodiments, examples of which are illustrated in the accompanying drawings and disclosed herein. Wherever convenient, the same reference numbers will be used throughout the drawings to refer to the same or like parts.

As discussed above, conventional dynamic lenses are mechano-optical lenses that have limited beam-steering range and are bulky in volume. To address these problems, the present disclosure provides an electro-optical liquid crystal lens which is "tunable," that is, which can change its focal length upon application of a control voltage, as well as small size and weight and low power consumption, fast speed, etc.

Figure 1:
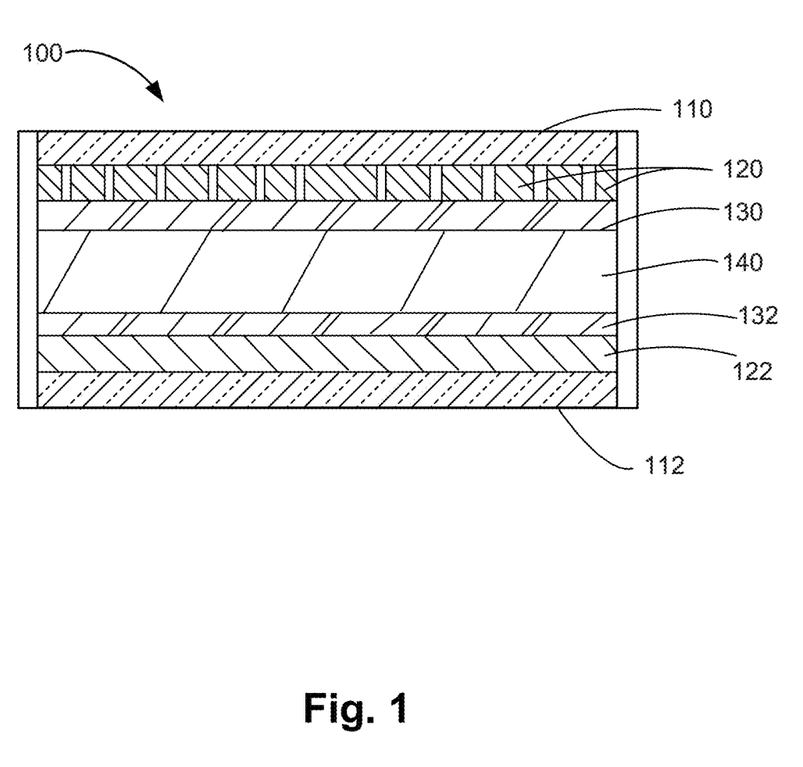
FIG. 1 is a schematic diagram illustrating a cross-sectional view of a portion of a liquid crystal lens, consistent with disclosed embodiments.

FIG. 1 is a schematic diagram illustrating a cross-sectional view of a portion of a liquid crystal lens 100, according to the disclosed embodiments. Referring to FIG. 1, lens 100 includes a pair of substrates 110, 112. In one embodiment, substrates 110 and 112 are planar and disposed parallel to each other, and are maintained at a desired distance by spacers (not shown). The spacing distance can vary, for example, from about 5 to about 100 microns. An electrode layer 120 is disposed on upper substrate 110 and an electrode layer 122 is disposed on lower substrate 112. Electrode layer 120 may include multiple individual electrodes that are physically separate from each other. Moreover, liquid crystal alignment layers 130 and 132 may be disposed on electrode layers 120 and 122, respectively. A liquid crystal layer 140 is disposed between substrates 110, 112 and in contact with alignment layers 130, 132. As utilized herein, the term "layer" does not require a uniform thickness, and imperfections or uneven thicknesses can be present so long as the layer performs its intended purpose.

In the disclosed embodiments, substrates 110, 112 may provide desired optical transmission and preferably are transparent, such that lens 100 can allow light to pass through. Substrates 110, 112 can be planar or curved. They can be made from various materials known in the art, such as glass, quartz, or a polymer. Substrates 110, 112 may be made from non-birefringent material, or may be aligned or compensated to minimize the effect of their birefringence.

Electrode layers 120, 122 are made of conductive material and can be deposited on substrate layers 110, 112 by any known method. In some embodiments, the multiple electrodes in electrode layer 120 may be formed utilizing a photo-lithographic process. The electrode layer material can be any inorganic, substantially transparent conductive material. Examples of suitable materials include metal oxides such as indium oxide, fin oxide, and indium tin oxide (ITO). In some embodiments, the thickness of the conductive electrode layer may vary, for example, from about 100 to about 2,000 angstroms. Electrode layers 120, 122 may be sufficiently thick to provide desired conductivity.

Consistent with the disclosed embodiments, alignment layers 130, 132 are used to induce a particular directional orientation in the liquid crystal when no voltage is applied to the lens 100. Various materials are suitable for use as alignment layers 130, 132, including, but not limited to, polyimide and polyvinyl alcohol. The thickness of alignment layer 50 should be sufficient to impart the desired directional orientation to the liquid crystal material, such as about 100 to about 1,000 angstroms. Alignment layer 50 is treated by rubbing, in some embodiments, to impart a substantially homogenous molecular orientation to the liquid crystal material prior to an electric field being applied to the material.

Consistent with the disclosed embodiments, any liquid crystal material that has an orientational order that can be controlled in the presence of an electric field can be utilized for lens 100, including any nematic, smectic, or cholesteric phase-forming liquid crystals, or polymer-containing liquid crystals such as polymer liquid crystals, polymer dispersed liquid crystals, or polymer stabilized liquid crystals. Desirable characteristics possessed by suitable liquid crystal materials include the ability to align the liquid crystal without much difficulty, rapid switching time, and a low voltage threshold.

Consistent with the disclosed embodiments, when an electric field is applied to liquid crystal layer 140, dipole moments are induced in the liquid crystal molecules. In particular, with larger induced dipole moment along the liquid crystal's director axis (long molecular axis of all molecules averaged), the director will tend to reorient along the electric field direction. The equilibrium orientation of the director depends on the magnitude of the applied electric field and the competing effect of the alignment layers applied to the surfaces of liquid crystal layer 140.

As described above, as shown in FIG. 1, electrode layer 120 may include multiple electrodes. The magnitude and timing of voltages applied on the multiple electrodes can be finely controlled to generate a desired electric field in liquid crystal layer 140, so as to control the liquid crystal orientation. Consistent with the disclosed embodiments, the number and sizes of electrodes in electrode layer 120 and the spaces between the electrodes may be designed to optimize the light phase retardation by different aperture size. By controlling the driving voltages for each of these electrodes, the light phase retardation over liquid crystal layer 140 may be optimized for a particular focal length.

Consistent with the disclosed embodiments, if the index of refraction is spatially varied by having electrodes with different voltages applied, the light passing through different electrode areas will have different propagating speeds. As a result, with the proper voltage profile, the wavefront of the light will start to tilt, which makes the light bend after passing through liquid crystal layer 140.

Figure 2:
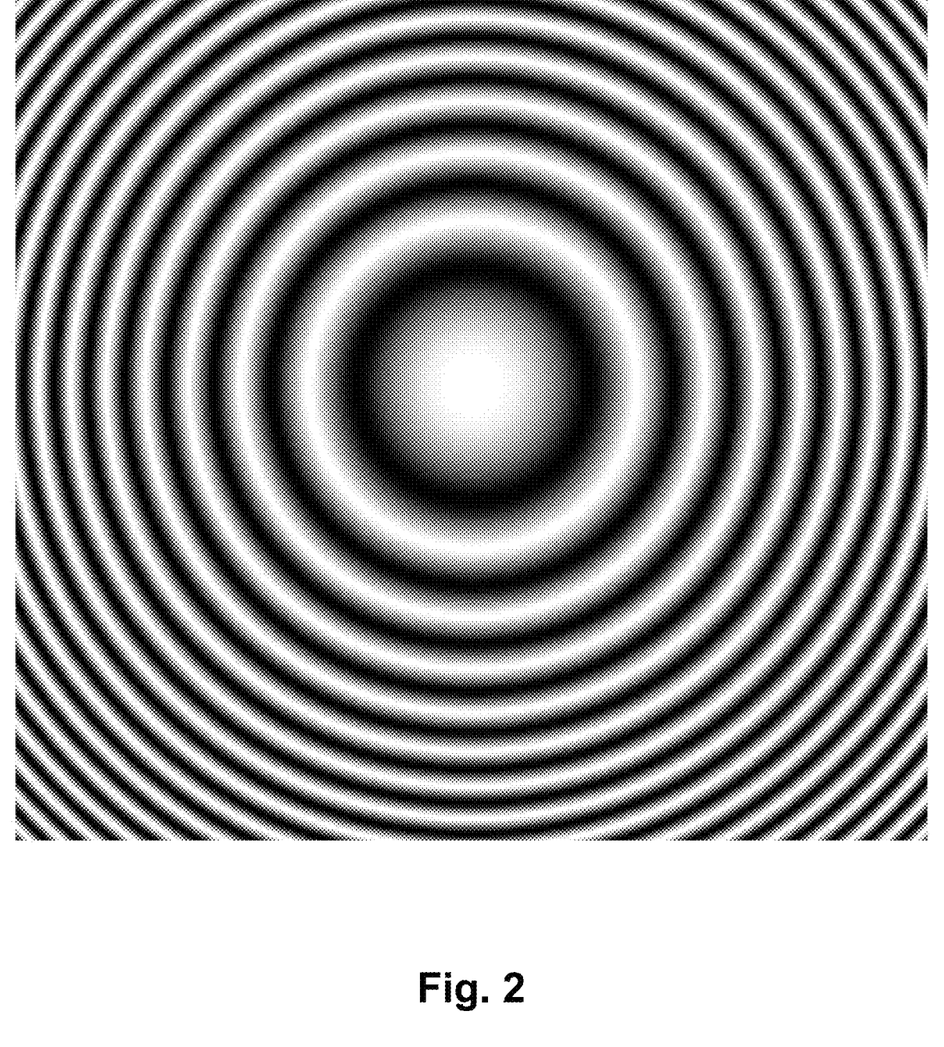
FIG. 2 is a schematic plan-view diagram illustrating a refractive index pattern of the liquid crystal lens shown in FIG. 1, consistent with disclosed embodiments.

FIG. 2 is a schematic plan-view diagram illustrating a refractive index pattern generated in liquid crystal layer 140 by controlling the voltages applied on the electrodes in electrode layer 120, according to an exemplary embodiment. As shown in FIG. 2, by controlling the voltages on the electrodes in electrode layer 120, a patterned electric field can be generated to orient the liquid crystal molecules in layer 140 differently, so as to form a refractive index profile that consists of alternating opaque (shown as black zones in FIG. 2) and transparent zones (shown as white zones in FIG. 2). This way, lens 100 can function as a Fresnel lens capable of focusing light. Moreover, by adjusting the strength and distraction of the electric field, the magnitudes of the refractive indices in the opaque and transparent zones can be adjusted, and the sizes of the opaque and transparent zones can be changed as well. This way, the focal length of the resulted Fresnel lens can be fine-tuned.

Figure 3:
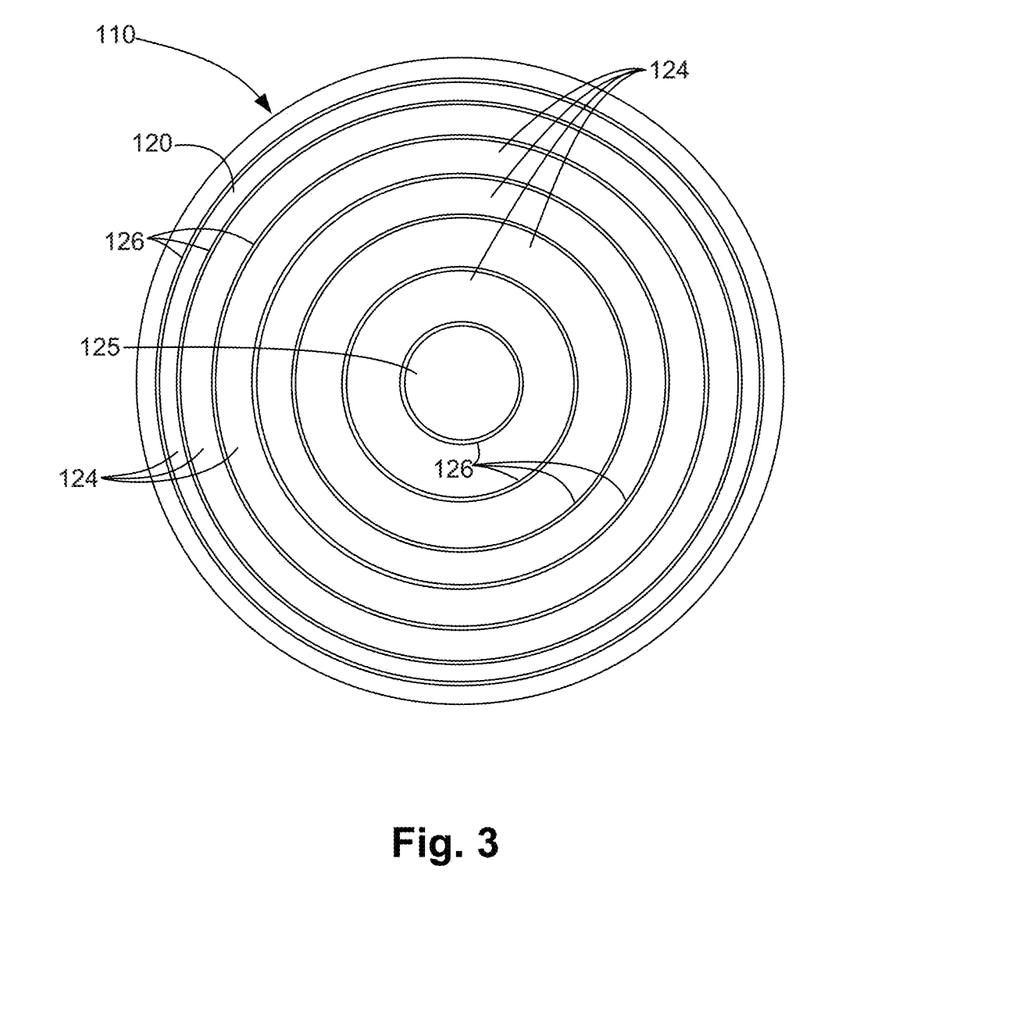
FIG. 3 is a schematic plan-view diagram illustrating a substrate and an electrode layer shown in FIG. 1, consistent with disclosed embodiments.

As discussed above, the desired refractive index profile in liquid crystal layer 140 can be achieved by controlling the timing and magnitude of the voltages applied on the multiple electrodes in electrode layer 120. Alternatively or additionally, in some embodiments, the desired refractive index profile may also be achieved by arranging the electrodes in electrode layer 120 to form a specific pattern or spatial distribution. FIG. 3 is a schematic plan-view diagram illustrating the substrate 110 and electrode layer 120 shown in FIG. 1, according to an exemplary embodiment. Referring to FIG. 3, electrode layer 120 is patterned and includes a plurality of individual electrodes such as in the shape of ring electrodes 124, surrounding a central disk electrode 125. Adjacent ring electrodes 124, and disk electrode 125 are electrically separated from each other by electrically insulating gaps 126.

Still referring to FIG. 3, insulating gaps 126 are open spaces located between adjacent electrodes 124, 125 or can be formed of a non-conducting insulating material such as silicon dioxide. Ring electrodes 124 may be substantially annular and concentric, although they may not all be formed as a perfect geometric shape due to the material and processing techniques utilized. Nevertheless, the term "ring" as utilized herein encompasses structures that are ring-like, e.g. elliptical rings. Likewise, disk 125 may be substantially circular, but may also be an elliptical shape. The number of ring electrodes 124 constituting electrode layer 120 can vary. For example, the number of ring electrodes 124 may range from about 10 to about 1000.

Still referring to FIG. 3, with the ring-structured electrodes, lens 100 can function as a Fresnel lens that can bend light beams, but is less bulky than the traditional spherical lens. In an exemplary embodiment, a liquid crystal layer having a thickness of about 25 μm may give an optical power of about 0.5 diopters for a lens diameter of approximately 1 cm. More optical power can be achieved by increasing the liquid crystal layer thickness, but eventually non-linearity in the fields will degrade the optical performance; the switching relaxation time between the various powers will also increase with liquid crystal thickness. Additional optical power can also be achieved by stacking multiple electro-optic devices 100.

Although FIG. 3 shows electrode layer 120 having a ring structure, the present disclosure does not limit the pattern or structure formed by electrode layer 120. For example, in some embodiments, electrode layer 120 may have a comb-like structure.

Consistent with the disclosed embodiments, to generate the electric field in liquid crystal layer 140, an appropriate voltage is applied to lens 100, namely electrode layer 120. Electrode layer 122 serves as a ground. The voltage is applied to lens 100 based on a number of factors, including, but not limited to, the liquid crystal material utilized and the thickness of the liquid crystal material between electrodes. Various methods are known in the art for controlling the voltage applied to the electrode, for example, a circuit, a processor or microprocessor. The controlling process may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, electrode layer 122 may also be divided to form multiple discrete electrodes, to increase the optical power of lens 100. Similar to electrode layer 120, the multiple electrodes in electrode layer 122 may be unpatterned or patterned.

Figure 4:
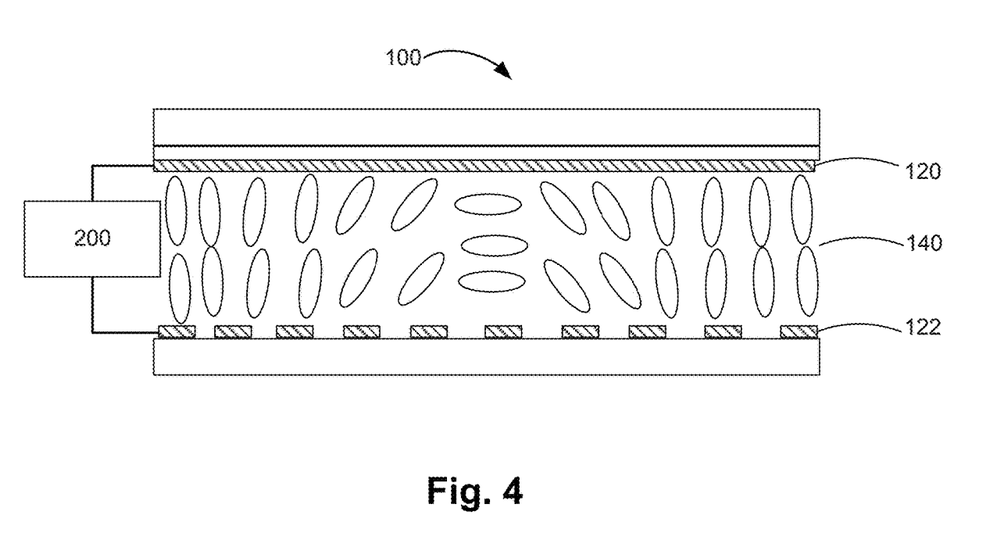
FIG. 4 is a schematic diagram illustrating a system for controlling an electric field in the lens shown in FIG. 1, consistent with disclosed embodiments.

FIG. 4 is a schematic diagram illustrating a system for controlling the electric field in lens 100, according to the disclosed embodiments. Referring to FIG. 4, electrode layers 120, 122 of lens 100 are connected to a controller 200, which is configured to control the voltages applied on electrode layers 120, 122.

Figure 5:
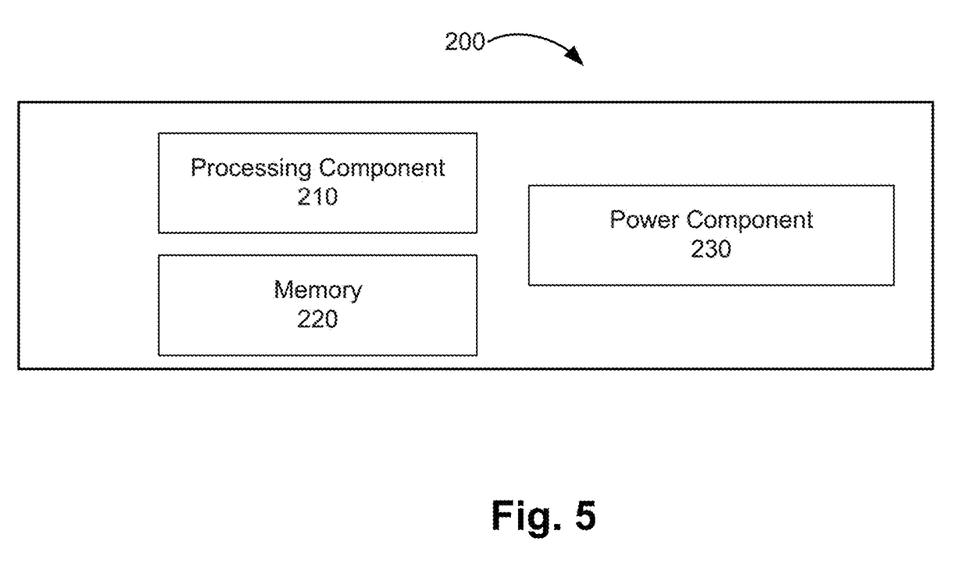
FIG. 5 is a block diagram of a controller shown in FIG. 4, consistent with disclosed embodiments.

FIG. 5 is a block diagram of controller 200, according to the disclosed embodiments. Referring to FIG. 5, controller 200 may include a processing component 210, a memory 220, and a power component 230.

Processing component 210 may control overall operations of the controller 200. For example, processing component 210 may include one or more processors that execute instructions to control the timing and magnitude of the voltage applied on electrode layers 120, 122, so as to form the desired electric field in lens 100. Moreover, processing component 210 may include one or more modules which facilitate the interaction between the processing component 210 and other components. For instance, processing component 210 may include an input/output module to facilitate the interaction between processing component 210 and power component 230. Power component 230 is configured to provide the voltage to be applied on electrode layers 120, 122.

Memory 220 is configured to store various types of data and/or instructions to support the operation of controller 200. Memory 220 may include a non-transitory computer-readable storage medium including instructions for applications or methods operated on controller 200, executable by the one or more processors of controller 200. For example, the non-transitory computer-readable storage medium may be a read-only memory (ROM), a random access memory (RAM), a CD-ROM, a magnetic tape, a memory chip (or integrated circuit), a hard disc, a floppy disc, an optical data storage device, or the like.

In the disclosed embodiments, controller 200 may be configured to control the electric field in lens 100 to dynamically change the focal point and focal length of lens 100. This way, lens 100 can be digitally controlled to bend or refract light dynamically. In some embodiments, multiple of lenses 100 may be combined to form a lens array. Each lens in the lens array may be individually controlled, such that the lens array can have multiple focal points and bend (or focus) different parts of a light beam differently.

The above-disclosed liquid crystal lens has tunable optic power that can be precisely controlled through the electric field applied to the lens. Moreover, comparing to the conventional mechano-optical lens, the disclosed liquid crystal lens has small size and weight, low cost and power consumption. It can be used in many applications such as imaging systems of compact cameras (such as compact cameras in mobile phones), eye correction, 3D display systems, head-mounted displays, holograph, etc.

Figure 6:
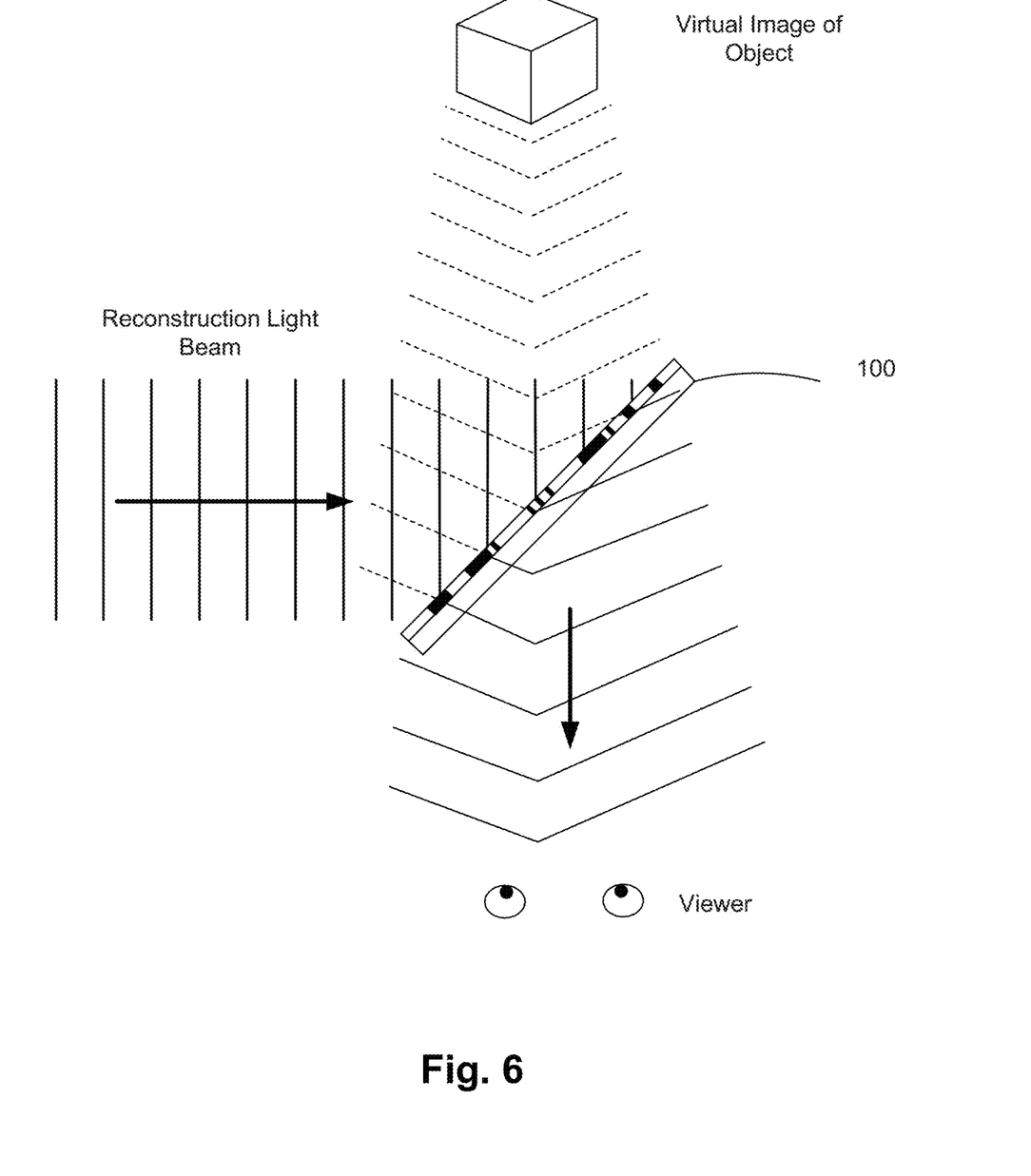
FIG. 6 is a schematic diagram illustrating a process for generating a dynamic hologram using the lens shown in FIG. 1, consistent with disclosed embodiments.

FIG. 6 is a schematic diagram illustrating a process for generating a dynamic hologram using lens 100, according to an exemplary embodiment. Holograms are created by capturing the interference pattern formed when a point source of coherent light (i.e., the reference beam) of fixed wavelength encounters light of the same fixed wavelength arriving from an object (i.e., the object beam). Referring to FIG. 6, by controlling the electric field in lens 100, the liquid crystal molecules may be oriented to form a refractive index profile corresponding to the interference pattern of a hologram. When a reconstruction light beam is projected to lens 100, the interference pattern formed in lens 100 may cause the reconstruction light beam to be diffracted to form a virtual image of the object. Consistent with the disclosed embodiments, the electric field in lens 100 may be controlled to change the interference pattern over time, so as to generate a dynamic or moving hologram. For example, controller 200 (not shown in FIG. 6) may compute or pre-store interference patterns corresponding to different objects or different states of the same object. Controller 200 may control the voltage applied on electrode layers 120, 122 to generate an interference pattern in lens 100, to recreate a three-dimensional image of an object. Controller 200 may further change the interference pattern over time to generate a moving image of the object.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with the true scope and spirit being indicated by the following claims and their full scope of equivalents.

What is claimed is:

1. A lens system, comprising:
a controller; and
an electro-optic lens electrically connected to the controller, the electro-optic lens comprising:
   a first substantially transparent substrate;
   a first electrode layer disposed on the first substantially transparent substrate, the first electrode layer comprising a plurality of electrodes;
   a first liquid crystal alignment layer disposed directly on the first electrode layer;
   a second substantially transparent substrate;
   a second electrode layer disposed on the second substantially transparent substrate;
   a second liquid crystal alignment layer directly disposed on the second electrode layer; and
   a liquid crystal layer located between the first liquid crystal alignment layer and the second liquid crystal alignment layer,
wherein the first liquid crystal alignment layer and the second crystal alignment layer are configured to induce a particular directional orientation in the liquid crystal when no voltage is applied to the lens; and
wherein the controller is configured to generate a refractive index pattern of the liquid crystal layer by controlling voltage applied across the first electrode layer and the second electrode layer, and wherein the refractive index pattern has a refractive index profile corresponding to a desired focal length of the electro-optic lens, wherein the refractive index profile consists of alternating opaque and transparent zones, wherein adjustments of the voltage applied across the first electrode layer and the second electrode layer causes adjustments to sizes of the opaque and transparent zones.

2. The lens system of claim 1, wherein the controller is further configured to vary magnitude of the voltage applied across the first electrode layer and the second electrode layer over time.

3. The lens system of claim 1, wherein the controller is further configured to individually control the voltage applied on each of the plurality of electrodes in the first electrode layer.

4. The lens system of claim 3, wherein the controller is further configured to control at least one of magnitude or timing of the voltage applied on each of the plurality of electrodes.

5. The lens system of claim 1, wherein the refractive index pattern of the liquid crystal layer corresponds to an interference pattern of a hologram, and the controller is further configured to change the refractive index pattern over time to generate a moving hologram.

6. The lens system of claim 1, further comprising:
a plurality of electro-optic lenses formed into a lens array;
wherein the controller is further configured to individually control voltage applied on each of the plurality of electro-optic lenses.

7. The lens system of claim 1, wherein the first electrode layer comprises a first plurality of ring electrodes.

8. The lens system of claim 7, wherein the electro-optic lens is adjustable from a first optical power to a second optical power when a first voltage is applied to the first plurality of ring electrodes.

9. The electro-optic lens of claim 7, wherein the second electrode layer comprises a second plurality of ring electrodes.

10. The system of claim 1, wherein the adjustments of the voltage comprise adjustments to the timing and magnitude of the voltage.

* * * * *